United States Patent
Belmonte et al.

(10) Patent No.: US 8,932,020 B2
(45) Date of Patent: Jan. 13, 2015

(54) LOW-PRESSURE TURBINE

(75) Inventors: Olivier Belmonte, Moissy Cramayel Cedex (FR); Gregory Nicolas Gerald Gillant, Moissy Cramayel Cedex (FR)

(73) Assignee: SNECMA, Paris (FR)

( * ) Notice: Subject to any disclaimer, the term of this patent is extended or adjusted under 35 U.S.C. 154(b) by 494 days.

(21) Appl. No.: 13/322,027

(22) PCT Filed: May 21, 2010

(86) PCT No.: PCT/FR2010/050992
§ 371 (c)(1),
(2), (4) Date: Nov. 22, 2011

(87) PCT Pub. No.: WO2010/136707
PCT Pub. Date: Dec. 2, 2010

(65) Prior Publication Data
US 2012/0063914 A1  Mar. 15, 2012

(30) Foreign Application Priority Data
May 28, 2009  (FR) ..................... 09 02584

(51) Int. Cl.
*F01D 1/24* (2006.01)
*F04D 13/12* (2006.01)
*F01D 5/06* (2006.01)

(52) U.S. Cl.
CPC ............. *F01D 5/066* (2013.01); *Y02T 50/671* (2013.01); *F05D 2250/712* (2013.01)
USPC .................................................. 416/198 R

(58) Field of Classification Search
CPC .......... F01D 5/066; F01D 5/06; F01D 5/025; F01D 5/326; F01D 5/3015; F05D 2250/712; F04D 29/02; F04D 29/34
USPC ........... 415/216.1, 199.5; 416/198 R, 198 A, 416/201 R, 219 R, 220 R
See application file for complete search history.

(56) References Cited

U.S. PATENT DOCUMENTS

| | | | |
|---|---|---|---|
| 6,471,474 B1 | 10/2002 | Mielke et al. | |
| 6,478,539 B1 | 11/2002 | Trutschel | |
| 7,364,402 B2 * | 4/2008 | Brault et al. | 415/174.5 |
| 7,390,170 B2 * | 6/2008 | Charrier et al. | 416/198 R |
| 2005/0246889 A1 | 11/2005 | Charrier et al. | |

FOREIGN PATENT DOCUMENTS

| | | |
|---|---|---|
| EP | 1 199 439 | 4/2002 |
| EP | 1 584 784 | 10/2005 |
| FR | 2 797 906 | 3/2001 |

OTHER PUBLICATIONS

International Search Report issued Jan. 27, 2011 in PCT/FR10/50992 filed May 21, 2010.

* cited by examiner

*Primary Examiner* — Edward Look
*Assistant Examiner* — Christopher J Hargitt
(74) *Attorney, Agent, or Firm* — Oblon, Spivak, McClelland, Maier & Neustadt, L.L.P.

(57) ABSTRACT

A low-pressure turbine for a turbomachine including turbine disks with festooned annular flanges for fastening to a festooned annular flange of a drive cone connecting the turbine disks to a turbine shaft, solid portions of the festooned annular flanges of the turbine disks and of the drive cone being connected to peripheries of the turbine disks and of the drive cone, respectively, via concave filets that are asymmetrical.

8 Claims, 2 Drawing Sheets

LOW-PRESSURE TURBINE

The invention relates to a low-pressure turbine for a turbomachine, the turbine having bladed disks connected to a turbine shaft by a drive cone that serves to position the turbine disks axially, to transmit driving torque, and to support various sealing members.

The turbine disks are fastened to the drive cone by festooned annular flanges that are located at the inner peripheries of the turbine disks and at the outer periphery of the drive cone, respectively, and that comprise alternating hollow portions and solid portions, the hollow portions serving to reduce weight, and the solid portions having holes for passing fastener members such as bolts.

In general, the solid portions of the festooned flanges are defined by convex filets that are connected by concave filets to the inner periphery of a turbine disk or the outer periphery of the drive cone, respectively.

While the turbomachine is in operation, driving torque is transmitted from the turbine disks to the turbine shaft via the drive cone, with this giving rise to stresses being concentrated at the bases of the solid portions of the festooned flanges, leading to a risk of these solid portions shearing off, with the stresses being in traction on one side and in compression on the other side of each solid portion of the festooned flanges.

A particular object of the invention is to avoid that drawback of the prior art.

To this end, the invention proposes a low-pressure turbine for a turbomachine, the turbine comprising bladed disks connected by a drive cone to a turbine shaft, the bladed disks and the drive cone including at their inner and outer peripheries, respectively, festooned annular flanges, each formed by alternating solid portions and hollow portions, with the solid portions including holes for passing fastener members, the turbine being characterized in that each solid portion of an above-mentioned flange is connected to the periphery of the disk or to the drive cone, respectively, by two concave fillets that are asymmetrical.

The asymmetry of the connections of the solid portions of the flanges enables those zones of the flanges that are the most stressed in operation to be reinforced, thus enabling stress to be balanced on either side of each solid portion of a flange, limiting deformation thereof and increasing its lifetime.

In an advantageous embodiment of the invention, the two concave filets that connect a solid portion of a flange to the periphery of a turbine disk or of the drive cone presents radii of curvature that are different, and for the drive cone, the radius of curvature of the concave filet that is in front relative to the direction of rotation is smaller than the radius of curvature of the other filet, with this arrangement being inverted for the turbine disks.

In an embodiment, the radius of curvature of the concave filet that is in front relative to the direction of rotation is 2 to 2.8 times smaller than the radius of curvature of the other concave filet of the solid portions of the festooned flanges.

The invention also provides a low-pressure turbine disk for a turbomachine, the disk being characterized in that it includes a festooned annular flange in which the solid portions are connected to the periphery of the disks via two concave filets that are symmetrical and that have different radii of curvature, as mentioned above.

The invention also provides a turbomachine drive cone including a festooned annular flange having solid portions connected to the periphery of the drive cone via concave filets that are asymmetrical and that have different radii of curvature, as stated above.

The invention also provides a turbomachine, characterized in that it includes a low-pressure turbine as described above.

The invention can be better understood and other characteristics, details, and advantages thereof appear more clearly on reading the following description, made by way of example with reference to the accompanying drawings, in which.

Figure 1:
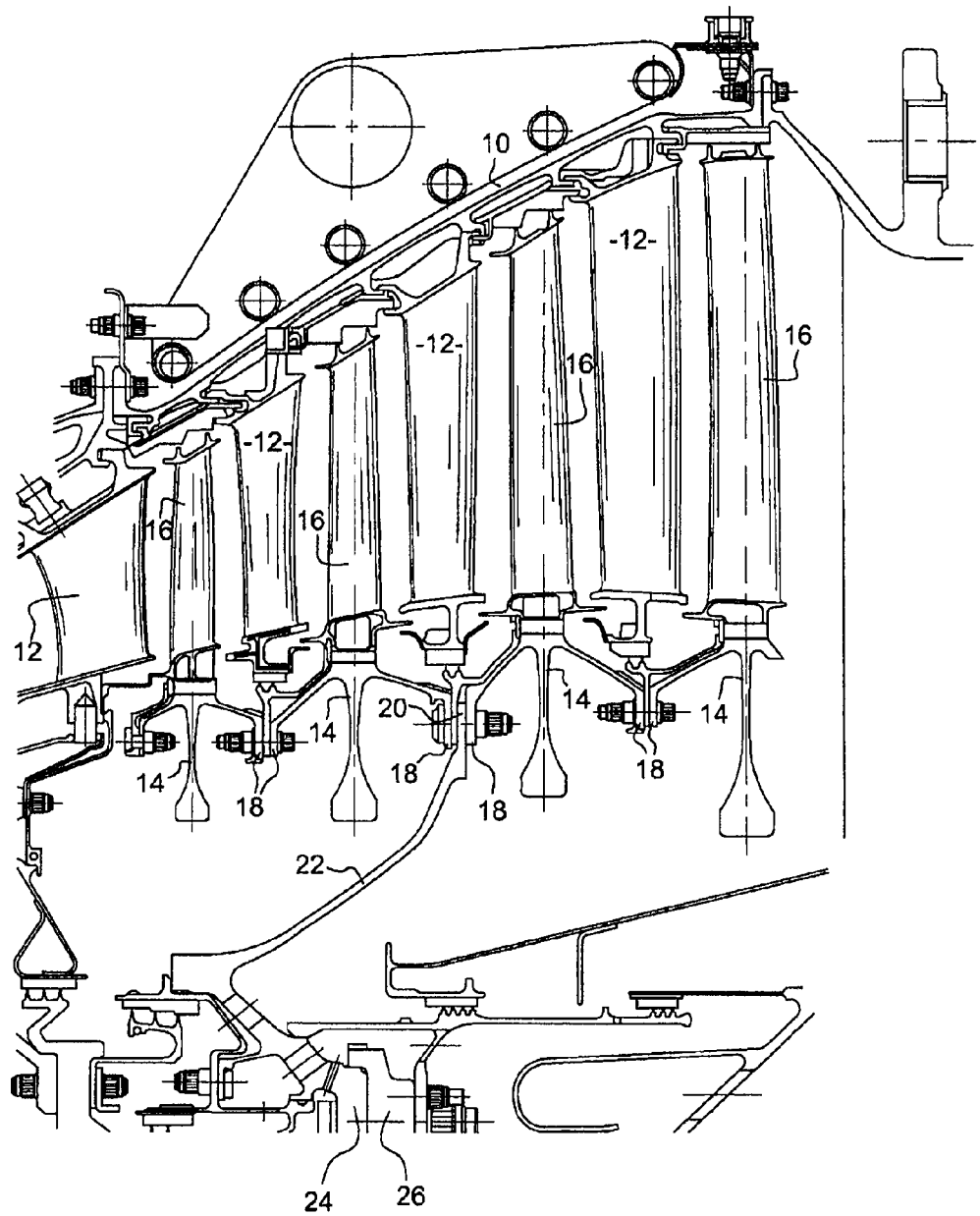
FIG. 1 is a diagrammatic half-view in axial section of a low-pressure turbine of the invention.

Reference is made initially to FIG. 1 which is a diagram of a low-pressure turbine of the invention, in a turbomachine such as an airplane turboprop or turbojet.

In known manner, the low-pressure turbine has a plurality of turbine wheels arranged in series inside a casing 10, each wheel being downstream from a stator nozzle 12 and comprising a disk 14 carrying blades 16 on its outer periphery.

In the example shown, the low-pressure turbine has four disks 14 with blades of length that increases progressively from upstream to downstream relative to the flow direction of the gas leaving the combustion chamber of the turbomachine.

The furthest upstream disk 14 has an annular flange 18 on its downstream side, whereby it is fastened to an upstream annular flange of the following disk of the turbine.

The furthest downstream disk 14 has an upstream annular flange 18, whereby it is fastened to a downstream annular flange of the preceding disk 14 in the turbine.

Each of the two intermediate disks 14 has an annular flange 18 for fastening to an annular flange 20 of a drive cone 22 that is arranged radially inside the turbine disks 14 and that includes at its radially inner end an annular flange 24 for fastening to an annular flange 26 of a turbine shaft.

Figure 2:
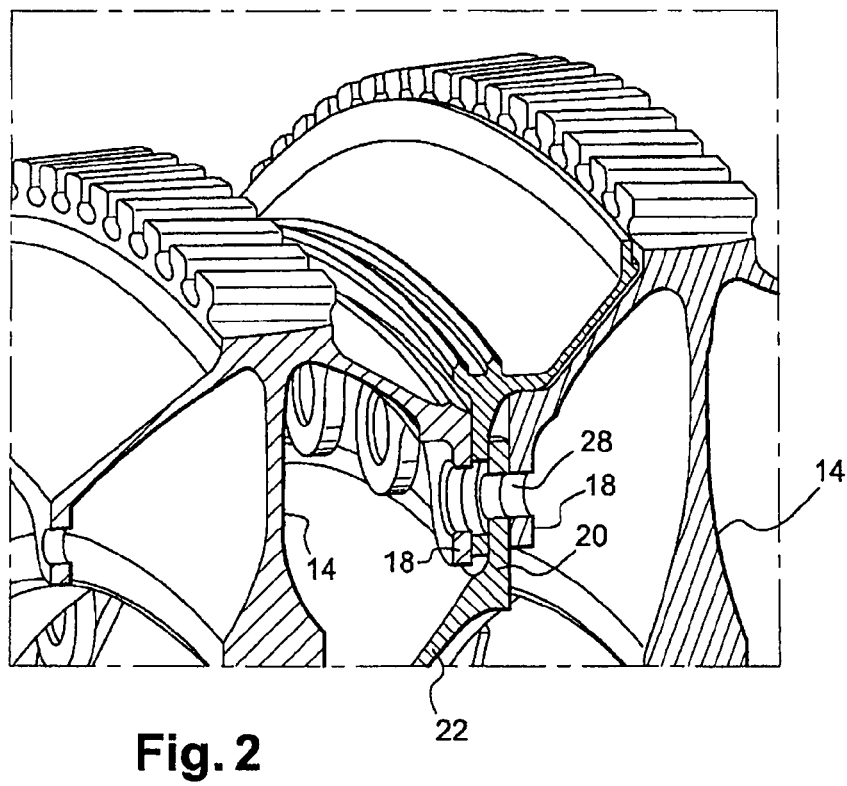
FIG. 2 is a fragmentary view in perspective and in section showing the flanges for fastening the turbine disks and the drive cone together.

As can be seen better in FIG. 2, the annular flanges 18 of the disks 14 and 20 of the drive cone 22 are festooned, i.e. they are formed by alternating solid portions and hollow portions, the solid portions having a convex rounded shape and including orifices 28 for passing fastener members such as bolts.

Figure 3:
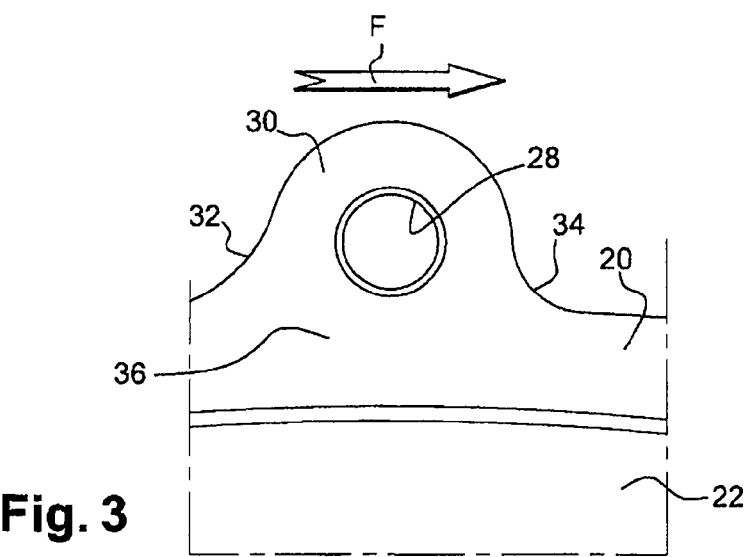
FIG. 3 is a fragmentary diagrammatic view on a larger scale of a solid portion of the festooned flange of the drive cone.

Each solid portion 30 of a festooned annular flange of a turbine disk 14 or of a drive cone 22 is connected to the periphery of the disk 14 or of the drive cone by two concave fillets 32 and 34 respectively (FIG. 3).

According to the invention, these two concave fillets 32 and 34 are asymmetrical, the purpose of their asymmetry being to make the stresses in the base 36 of the solid portion 30 more uniform, where these stresses are due to transmitting a driving torque from the turbine disks to the turbine shaft while the turbomachine is in operation.

With the direction of rotation of the turbine being represented by arrow F in FIG. 3, the stresses that are concentrated in the vicinity of the concave fillet 34 that is located at the front relative to the direction of rotation, are compression stresses, whereas those that are concentrated in the vicinity of the concave fillet 32 that is situated at the rear relative to the direction of rotation are traction stresses. The traction stresses in the vicinity of the concave fillet 32 are added to the traction stresses that are due to centrifugal forces in rotation. This concentration of stresses can cause the solid portion 30 to break in shear at its base after operating for a certain length of time.

To avoid this drawback, the two concave fillets 32 and 34 of the solid portions of a festooned flange are asymmetrical, and in a particularly simple embodiment, they present radii of curvature that are different. This difference in the radii of curvature of the fillets 32 and 34 serve to make the stresses around the two concave fillets more uniform during transmission of driving torque from the turbine disks to the drive cone.

In an embodiment, the radius of curvature of the front concave fillet 34 of the drive cone, which is a driven part, is 2 to 2.8 times smaller than the radius of curvature of the concave fillet 32 situated at the rear relative to the direction of rotation (where the concave fillet 34 situated at the front corresponds to what has been the usual practice in the art).

In an embodiment of the invention, the drive cone 22 has a diameter of 530 millimeters (mm), the solid portions 30 of the festooned annular flange of the drive cone have an outside radius of 520 mm, the radius of curvature of the front fillet 34 is 5 mm, and the radius of curvature of the rear concave fillet 32 is 12 mm.

The solid portions of the festooned annular flanges 18 of the turbine disks, which are driving parts, have a configuration that is inverted relative to that of FIG. 3, i.e. the concave fillets connecting their solid portions to the peripheries of the disks are asymmetrical, with the concave fillets situated at the front relative to the direction of rotation having radii of curvature that are greater than the radii of curvature of the concave fillets situated on the other sides of the solid portions.

When the radius of curvature of the concave fillet 34 situated at the front of a solid portion of the festooned flange 20 of the drive cone is 2 to 2.8 times smaller than the radius of curvature of the concave fillet situated at the rear, the concave fillets connecting the solid portions of the festooned flanges to the disks of the turbine that are at the rear relative to the direction of rotation have radii of curvature that are 2 to 2.8 times smaller than the radii of curvature of the concave fillets situated at the front.

This limits the deformations of the solid portions in operation, with the stresses on either side of these solid portions being balanced and with the lifetimes of the drive cone and of the annular fastening flanges of the turbine disks being increased.

The invention claimed is:

1. A low-pressure turbine for a turbomachine, the turbine comprising:
   bladed disks connected by a drive cone to a turbine shaft, the bladed disks and the drive cone including at their inner and outer peripheries, respectively, festooned annular flanges, each formed by alternating solid portions and hollow portions, with the solid portions including holes for passing fastener members,
   wherein each solid portion is connected to the periphery of the disk or to the drive cone, respectively, by two concave fillets that are asymmetrical.

2. A turbine according to claim 1, wherein the two concave filets have different radii of curvature.

3. A turbine according to claim 2, wherein the radius of curvature of the concave filet that is in front relative to the direction of rotation is less than the radius of curvature of the other concave filet for the drive cone, and vice versa for the turbine disks.

4. A turbine according to claim 2, wherein the radius of curvature of the concave filet that is at the front relative to the direction of rotation is 2 to 2.8 times smaller than the radius of curvature of the other concave filet for the drive cone, and vice versa for the turbine disks.

5. A low-pressure turbine disk, comprising a festooned annular flange as defined in claim 1.

6. A drive cone for a low-pressure turbine in a turbomachine, the drive cone comprising a festooned annular flange as defined in claim 1.

7. A turbomachine, an airplane turboprop, or a turbojet, comprising a low-pressure turbine according to claim 1.

8. A low-pressure turbine for a turbomachine, the turbine comprising bladed disks connected by a drive cone to a turbine shaft, the bladed disks and the drive cone including at their inner and outer peripheries, respectively, festooned annular flanges, each formed by alternating solid portions and hollow portions, with the solid portions including holes for passing fastener members, wherein each solid portion of the bladed disks and of the drive cone is connected to the periphery of the bladed disk or of the drive cone, respectively, by two concave fillets, one on a front side and one on a rear side of the solid portion relatively to a circumferential direction of rotation,
   the concave filet on the front side of each solid portion of the drive cone having a radius of curvature smaller than the radius of curvature of the concave filet on the rear side of the same solid portion, and
   the concave filet on the rear side of each solid portion of the bladed disks having a radius of curvature smaller than the radius of curvature of the concave filet on the front side of the same solid portion.

* * * * *